(12) United States Patent
Jameson

(10) Patent No.: US 9,301,645 B2
(45) Date of Patent: Apr. 5, 2016

(54) RACK FOR COOKING BACON AND THE LIKE

(71) Applicant: Jameson Consulting, LLC, Carson City, NV (US)

(72) Inventor: Paul G. Jameson, Incline Village, NV (US)

(73) Assignee: Jameson Consulting, LLC, Carson City, NV (US)

( * ) Notice: Subject to any disclaimer, the term of this patent is extended or adjusted under 35 U.S.C. 154(b) by 51 days.

(21) Appl. No.: 13/953,061

(22) Filed: Jul. 29, 2013

(65) Prior Publication Data

US 2015/0030742 A1   Jan. 29, 2015

(51) Int. Cl.
*A47J 37/06* (2006.01)
*A47J 37/10* (2006.01)
*A23L 1/01* (2006.01)

(52) U.S. Cl.
CPC .......... *A47J 37/0694* (2013.01); *A23L 1/0128* (2013.01); *A47J 37/108* (2013.01)

(58) Field of Classification Search
CPC ............................ A47J 37/067; A47J 37/0704
USPC .............. 99/450, 444, 445, 446, 400; 211/40, 211/41.2, 106, 134
See application file for complete search history.

(56) References Cited

U.S. PATENT DOCUMENTS

| | | | |
|---|---|---|---|
| 4,064,797 A | 12/1977 | Forlani | |
| 4,129,067 A | 12/1978 | Reiland | |
| 4,172,305 A | 10/1979 | Henebry | |
| 4,173,180 A | 11/1979 | Reiland | |
| 4,343,978 A | 8/1982 | Kubiatowicz | |
| D279,539 S | 7/1985 | Gerber | |
| 4,786,513 A | 11/1988 | Monforton | |
| 4,879,128 A | 11/1989 | Morin | |
| 4,924,049 A | 5/1990 | Dexter | |
| 4,952,764 A | 8/1990 | Harrington | |
| D386,939 S | 12/1997 | Kelly | |
| 5,935,478 A | 8/1999 | Parduhn | |
| 6,506,108 B1 | 1/2003 | Jagusch | |
| D514,874 S | 2/2006 | Eckley | |
| 7,004,064 B1 | 2/2006 | Turner | |
| 7,259,360 B2 | 8/2007 | Sholders | |
| D589,070 S | 3/2009 | Beld | |
| 2008/0173186 A1* | 7/2008 | Roake | ............... 99/385 |

OTHER PUBLICATIONS

Dixie Grillworks Bacon Boss & Grillipede, 2010.
Bacon Genie (date unknown).
Bacon Wave (date unknown).
Mr. Bar-b-Q Bacon Tray (date unknown).
Powercrisp Micro Bacon Cooker (2009).

* cited by examiner

*Primary Examiner* — Tu B Hoang
*Assistant Examiner* — Thomas Ward
(74) *Attorney, Agent, or Firm* — William H. Eilberg

(57) ABSTRACT

A cooking rack for bacon, or other food products, includes several articulated planar members defining a series of connected V-shaped structures. Each planar member, which may be defined by a plurality of generally parallel wires or other members, is generally porous. Bacon strips are placed on the planar members, and the rack is placed in a cooking vessel. The porosity of the planar members allows air to flow around the bacon during cooking, and allows liquids to fall from the bacon into a vessel below. The V-shaped structures may include spacers which prevent adjacent strips of bacon from touching each other.

6 Claims, 6 Drawing Sheets

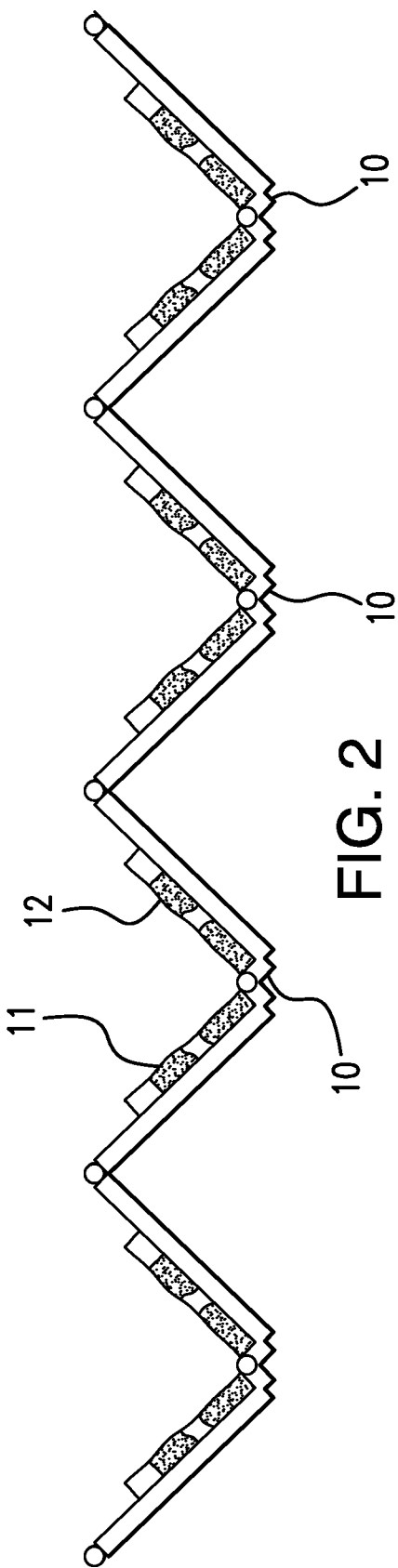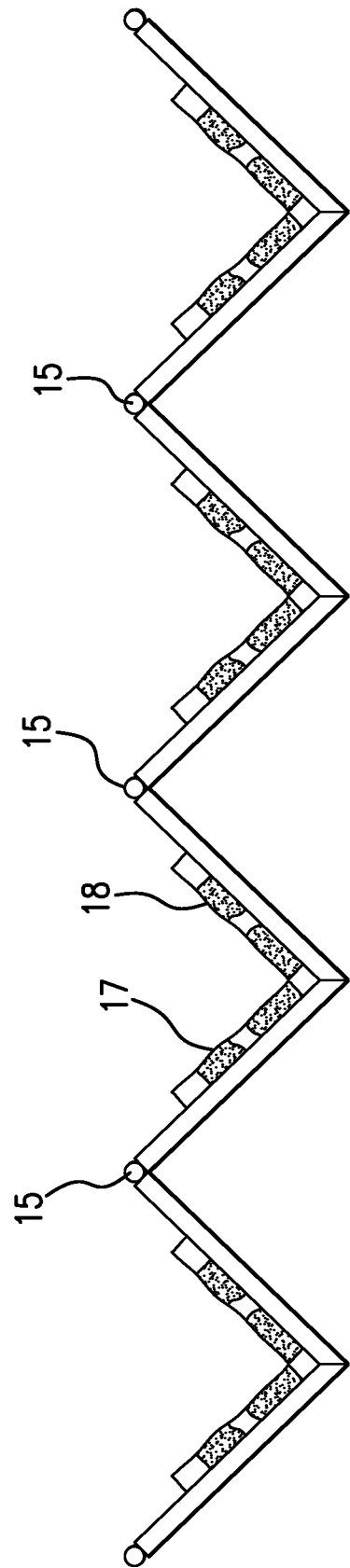

RACK FOR COOKING BACON AND THE LIKE

BACKGROUND OF THE INVENTION

The present invention relates to the cooking of bacon and other foods, and provides a rack which optimizes the cooking process.

Conventional baking sheets are flat and solid structures which lie parallel to the floor. Such sheets do not allow substantial air flow around the entire food product, and also do not provide for drainage of liquid from the food being cooked. They also do not enable liquid from the food product to drip over the food product. A flat and non-porous structure would allow liquid to drain from the food, but would not allow air to flow around the food product.

Bacon and other relatively thin food products may curl when cooked, and may lift off the cooking surface. Conventional baking sheets and racks also do not address this problem. The parts of the food in contact with the surface tend to overcook, and the parts which have curled away from the surface tend to undercook. The result is uneven cooking.

The present invention solves the above-described problems, by providing a cooking rack which effectively acts as a rotisserie, but which has no moving parts. The cooking rack of the present invention therefore comprises a cost-effective and simple means for cooking bacon and other foods. The cooking rack of the present invention is easy to clean, and provides a means for cooking such that the food is not greasy, but is crisp and consistently and evenly cooked. The rack of the present invention can also be scaled, such as by providing the rack in multiple layers, so that relatively large quantities of food can be cooked at once.

SUMMARY OF THE INVENTION

The present invention comprises a rack for cooking foods, especially foods formed in thin strips such as bacon. The rack of the invention includes a plurality of generally porous, planar members, the planar members being connected to each other, preferably along their edges. Each planar member is oblique relative to an adjacent planar member. Thus, the rack comprises a structure which defines a plurality of connected and congruent V-shaped structures. Dowels are positioned along the planar members, and preferably along one or more of the edges of the planar members, to provide rigidity to the rack. In one embodiment, there may be a dowel along every edge of every planar member, but a smaller number of dowels may be used.

In another preferred embodiment, each V-shaped structure includes a W-shaped structure located at the bottom of the "V". The W-shaped structure defines a spacer or step which prevent strips of bacon, or other food products, lying on adjacent surfaces of the "V", from touching each other.

The planar members are defined, in one preferred embodiment, by a plurality of stiff, generally parallel support wires. Structures other than wires can be used. The planar members may be formed of a mesh or lattice, or a perforated sheet. A plane defined by a set of wires is considered porous, insofar as there are ample spaces between the wires for flow of air and liquids.

The rack of the invention can be arranged in a stack of similar racks, each layer of the rack being spaced apart from an adjacent layer by at least one strut. The struts can have feet which rest on an apex of an adjacent layer. The use of a stack allows the cooking of a relatively large amount of food at once. The stack is also convenient for purposes of storage.

The present invention therefore has the primary object of providing a rack for cooking bacon and other food products.

The invention has the further object of improving the cooking of bacon and other foods, by providing a cooking device which promotes the flow of air around the food product, and by providing means for draining liquids from the food product during cooking.

The invention has the further object of providing a cooking rack which has the advantages of a rotisserie, but which has no moving parts.

The invention has the further object of providing a cooking rack which can be conveniently stacked with other such racks, either during cooking or for storage.

Other objects and advantages of the present invention will be apparent to the reader skilled in the art, from a reading of the following brief description of the drawings, the detailed description of the invention, and the appended claims.

BRIEF DESCRIPTION OF THE DRAWINGS

FIG. 2 provides a side view of the bacon rack of the present invention, showing the V-shaped nature of the rack.

FIG. 3 provides a side view of an alternative embodiment of the bacon rack of the present invention, in which the rack does not have dowels along the bottom portions of the V's.

DETAILED DESCRIPTION OF THE INVENTION

Figure 1:
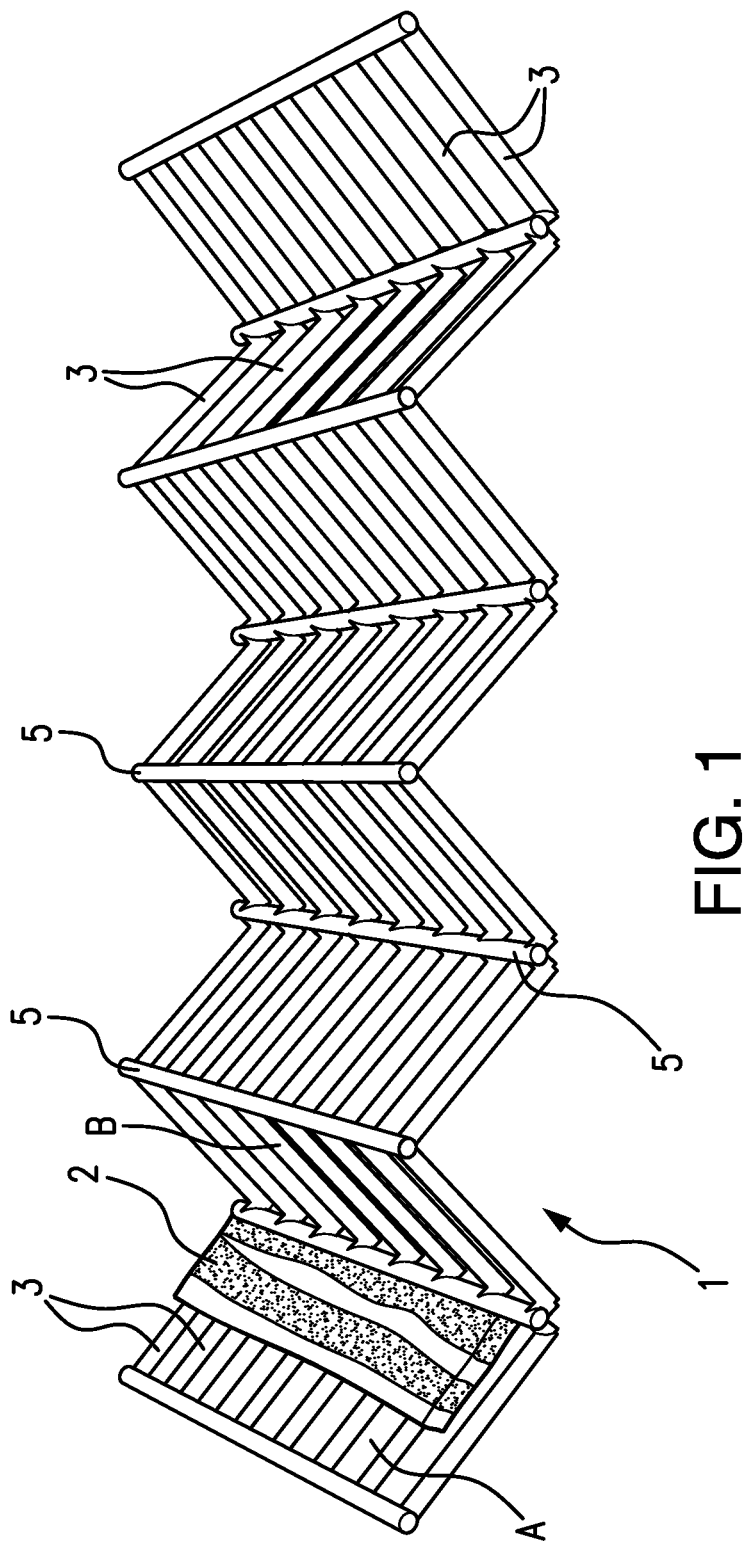
FIG. 1 provides a perspective view of a bacon rack, made according to the present invention, showing a piece of bacon thereon.

FIG. 1 provides a perspective view illustrating a first embodiment of the present invention. The invention comprises rack 1 which holds a piece of bacon 2. In the embodiment of FIG. 1, the rack is defined by a plurality of stiff, spaced-apart support wires 3, the support wires being generally parallel to each other. The support wires are angled in a periodic manner, such that the support wires together define a plurality of support planes, each of which is oblique, i.e. non-parallel, relative to adjacent support planes.

Thus, in FIG. 1, support wires 3 define an effective support plane A upon which the piece of bacon 2 rests. The support wires define an effective support plane B, which is oblique relative to support plane A. The angling of the support wires 3 defines the plurality of support planes illustrated in the figure. Thus, the rack comprises a plurality of articulated planar members.

Each planar member shares an edge with an adjacent planar member. Also, each planar member is oblique to an adjacent planar member, and is oblique to the bottom of a cooking vessel (such as the vessel 60 of FIG. 6).

The support wires are intended to be generally perpendicular to the longitudinal axis of the strip of bacon, or other food product. This relationship is clearly evident in FIG. 1.

In one preferred embodiment, the support wires 3 are thin, stiff metal wires. The spaces between the wires comprise openings through which air and liquid can freely pass. It is desirable to minimize the amount of contact between the support wires and the food product, so as to maximize the air flow around, and to permit liquid to drip from, the food product. This goal is accomplished with the use of relatively thin wires or similar structures having ample openings or pores between them. The thickness of the wires is somewhat exaggerated in FIG. 1, for purposes of illustration.

The support wires 3 of FIG. 1 are anchored by a plurality of dowels 5. Each dowel is positioned along an edge of a planar member, and is connected, such as by welding or other means, to the wires or other structures defining the planar member. In the preferred embodiment, the support wires are rigidly formed into the shape shown in FIG. 1, and the rack is effectively a unitary piece which always retains the same shape. However, in an alternative arrangement, the dowels could comprise pivotable mounting devices, allowing each planar member to rotate around the dowel. In such an alternative arrangement, the assembly of support wires could be collapsed or folded into a compact structure.

The bacon rack of the present invention, as illustrated in FIG. 1, has the following important features:

First, each support plane is slanted relative to the bottom of a cooking vessel. That is, each support plane is oblique to the ground, and oblique to the bottom of a cooking vessel.

Secondly, each support plane defines a permeable structure. The planar members are sufficiently porous to allow air to flow freely around the bacon, and to allow liquid from the bacon to flow through such planes and to reach the bottom of the cooking vessel.

Thirdly, the bacon rack is periodic. The rack comprises a plurality of support planes, each being non-parallel to the adjacent support plane. Each pair of support planes is a V-shaped structure, and this V-shaped structure is repeated through the extent of the rack.

In particular, when viewed from the side, as shown for example in FIG. 2, the rack of the present invention has the shape of a plurality of connected "V"s. Each strip of bacon or other food material therefore lies on one half of a "V". In the example illustrated in FIG. 1, where there are four "V"s, there are eight support planes upon which strips of bacon can be placed.

In the preferred embodiment, each V-shaped structure has the same size. More precisely, in the preferred embodiment, the V-shaped structures are congruent, in that both the size and the angles of the arms of the "V" are substantially the same from one "V" to the next.

As stated above, the purpose of the dowels 5 is to provide structural strength to the bacon rack. In the embodiment shown in FIG. 1, there is a dowel at every edge of each planar member. But in the embodiment of FIG. 3, there are dowels only along edges comprising the top portions of the "V" structure.

It should therefore be appreciated that not all of the dowels shown in FIG. 1 are absolutely necessary. It is possible to eliminate the "bottom" dowels, i.e. those dowels which are located below the level of the bacon, or the "top" dowels, i.e. those dowels which are located above the level of the bacon. In another alternative, one could eliminate some but not all of the top dowels, and some but not all of the bottom dowels. It is even possible to provide the entire structure with as few as one or two dowels, which would still hold the assembly of support wires together. The use of additional dowels provides additional structural rigidity. All of these alternatives should be considered within the scope of the invention.

FIGS. 2 and 3 provide end views illustrating further features of the invention. FIG. 2 shows the embodiment wherein the bottom portions of the Vs, i.e. those portions of the support wires 3 which are intended to rest on a cooking surface (not shown in FIGS. 2 and 3), are formed into the shape of a "W", illustrated by reference numeral 10.

The W-shaped structure therefore defines spacers or steps for adjacent planar members. The step or spacer defined by the W-shaped structure insures that strips of bacon or other foods, placed on adjacent planar members (i.e. adjacent sections of a "V") do not directly contact each other.

Thus, in FIG. 2, adjacent pieces of bacon, such as pieces 11 and 12, do not touch each other. If the pieces of bacon were allowed to touch, the result would be less than optimal drainage of liquid from each piece of food. The "W" structure is sized such that the middle portion of the "W", which comprises the step or spacer, is large enough to fulfill its function as a spacer.

Note also that the embodiment of FIG. 2 includes dowels, but that the presence or absence of the dowels is not necessarily related to whether the adjacent pieces of bacon can touch. That is, the "W" structure of the support wires is preferably sufficient to prevent contact of adjacent pieces of bacon, regardless of whether a dowel is present near the "W".

FIG. 3 illustrates the embodiment wherein there are no dowels at the bottom of the Vs, i.e. at the locations intended to rest on the bottom of a cooking vessel. But the embodiment of FIG. 3 includes dowels at the tops of the Vs, i.e. at positions above the bacon, such as dowels 15. In the embodiment of FIG. 3, the ends of adjacent pieces of bacon are allowed to touch, as illustrated by bacon pieces 17 and 18.

Figure 4:
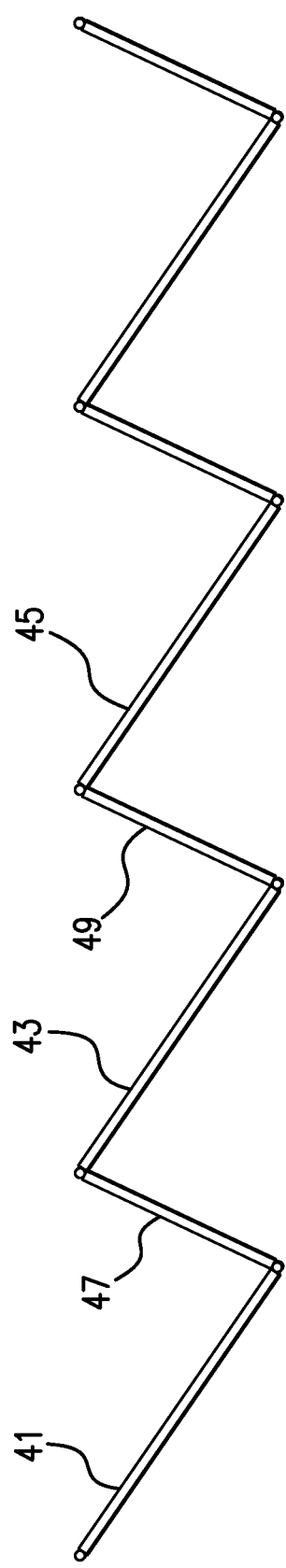
FIG. 4 provides a side view of another embodiment of the bacon rack of the present invention, wherein the rack defines a sawtooth pattern.

FIG. 4 illustrates, through a simplified end view, another embodiment, wherein the support wires define a sawtooth pattern. In this embodiment, every other support plane, such as support planes 41, 43, and 45, is oriented at a relatively small angle relative to the bottom of the cooking vessel (not shown), while the remaining support planes, such as planes 47 and 49, are oriented at steeper angles. Thus, the embodiment of FIG. 4 comprises support planes which are alternately relatively shallow and relatively steep. In this embodiment, there would normally be only one piece of bacon held within a single "V".

Figure 5:
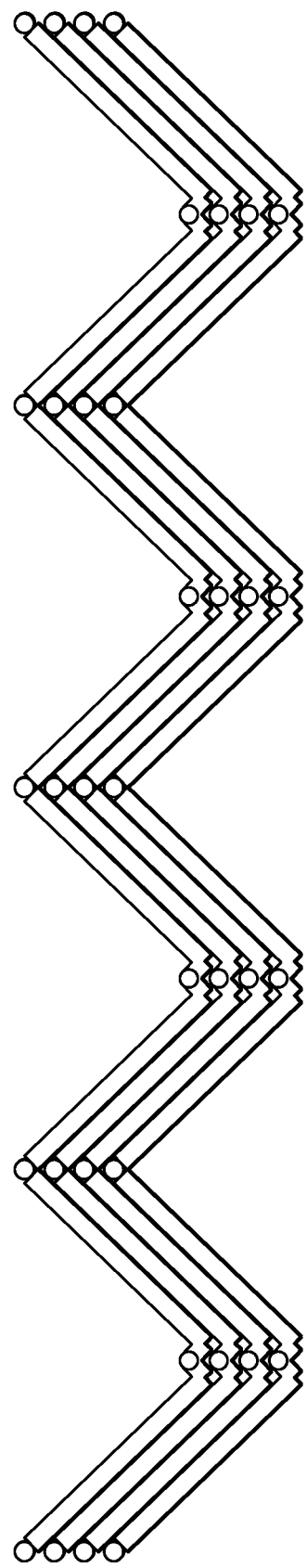
FIG. 5 provides a side view showing the stacking of multiple racks made according to the present invention.

FIG. 5 illustrates the stacking of multiple bacon racks according to the present invention. As explained above, in the preferred embodiment, the rack is rigid, and does not fold into a smaller space. However, such rigid racks may be stacked as shown in FIG. 5, thereby minimizing storage space.

Figure 6:
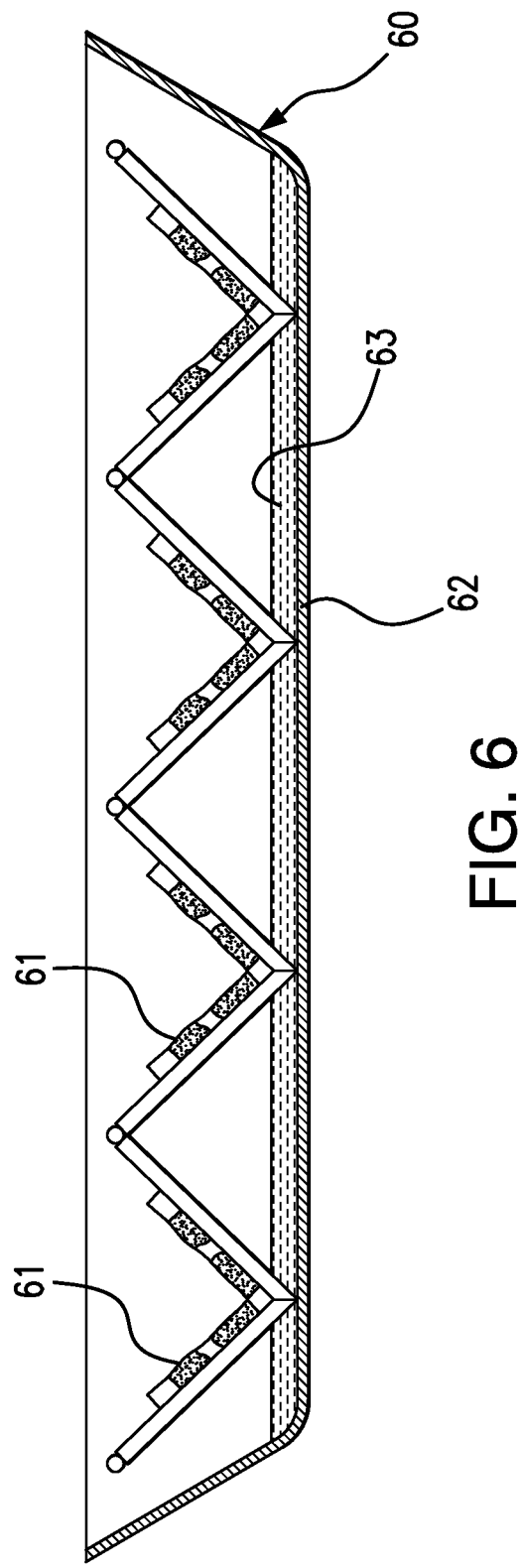
FIG. 6 provides a cross-sectional view of a bacon rack of the present invention, the rack being disposed within a cooking vessel.

FIG. 6 illustrates a bacon rack of the present invention, of the type shown in FIG. 3, inserted into a cooking vessel 60. It is understood that any embodiment of the bacon rack of the present invention can be placed within the cooking vessel. FIG. 6 shows a plurality of pieces of bacon 61, as well as a pool 63 of liquid which has flowed from the bacon and which has accumulated at the bottom 62 of the vessel.

In FIG. 6, the walls of the vessel are shown to be taller than the bacon rack. This feature can be modified. The walls of the vessel could instead be shorter than, or equal to, the height of the rack. In general, vessel walls which are shorter may enhance the benefit of air flow around the food product. All of the above alternatives should be considered within the scope of the invention.

Figure 7:
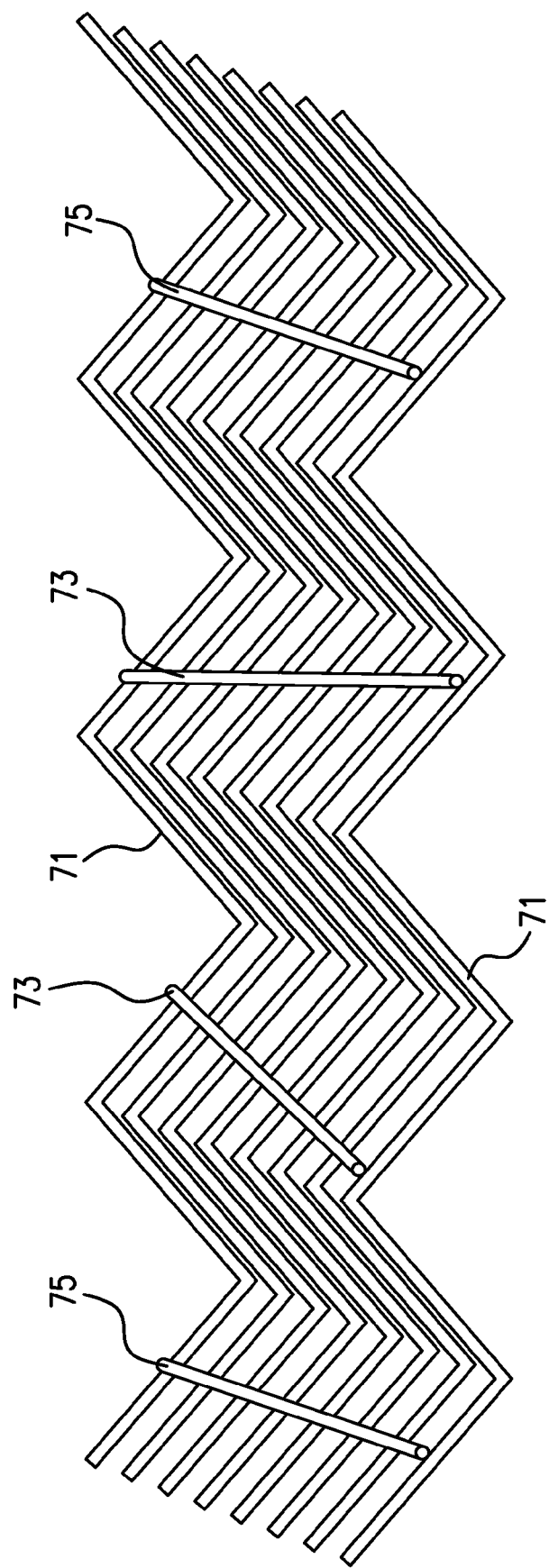
FIG. 7 provides a perspective view of another embodiment of the bacon rack of the present invention, in which dowels are positioned at locations other than the edges of the planar members.

FIG. 7 shows a perspective view of an alternative embodiment of the present invention. In this embodiment, the rack is formed, as before, of a plurality of stiff wires 71 which have been bent into the desired configuration as shown. But the dowels, such as dowel 73, are not located at the edges, but instead are positioned elsewhere. Dowels 73 are positioned obliquely along support surfaces defined by the wires, the dowels being affixed to the wires by welding or equivalent means. Dowels 75 are positioned along the middle of the support surfaces, but are orthogonal relative to the wires. It should be understood that dowels can be provided as shown in FIG. 1, or as shown in FIG. 7, or in any combination of configurations. All such variations should be considered within the scope of the invention.

Figure 8:
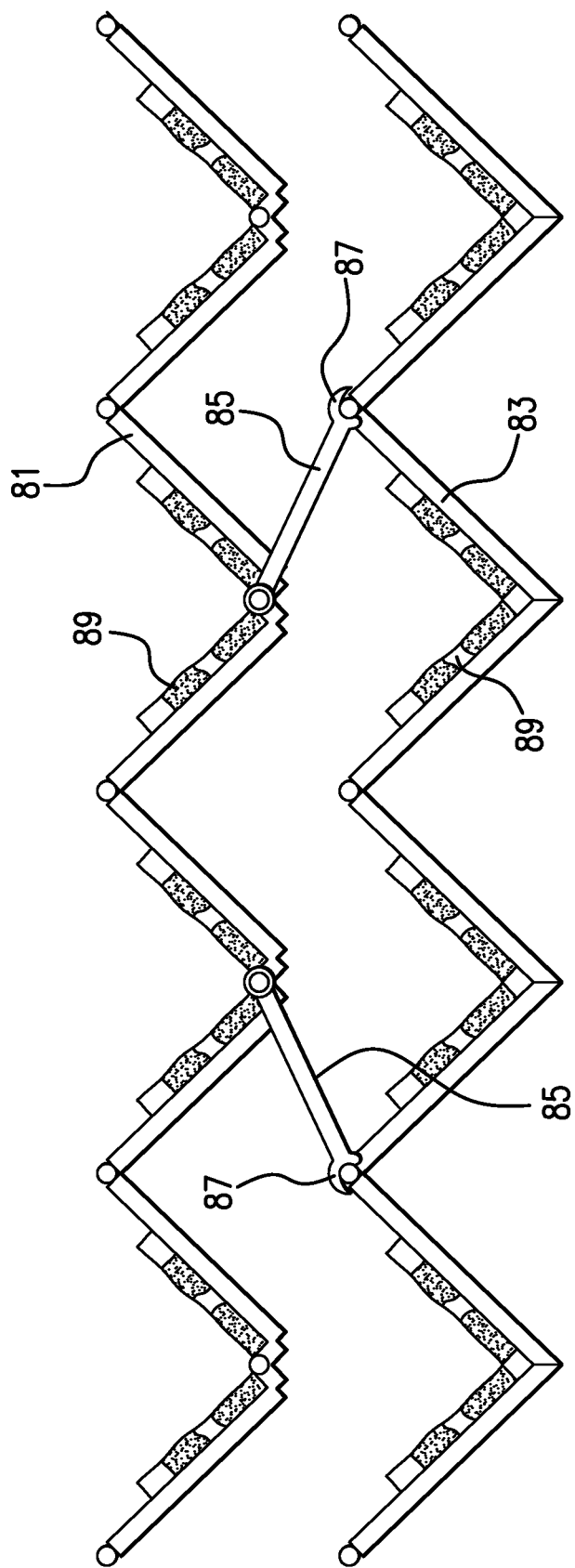
FIG. 8 provides a side view of another embodiment of the present invention, in which a plurality of racks are arranged in a stack, to cook food arranged on each element of the stack.

FIG. 8 illustrates the stacking of multiple layers of the rack of the present invention, for purposes of cooking greater amounts of food. Racks 81 and 83 are similar to the racks shown in FIGS. 2 and 3. The racks are spaced apart by struts 85, so that food products 89 can be placed on both racks. The struts terminate in feet 87 which engage the rack below. The feet can simply rest on the rack, so that they are readily removable, or they could be permanently or temporarily affixed to the other rack. Other arrangements for holding the racks in a spaced-apart condition could be used. Additional layers could be added in a similar manner.

The bacon rack of the present invention can be formed by means other than the generally parallel support wires 3. For example, instead of parallel wires or metal bars or other support structures, one could provide a mesh or lattice structure, or a perforated sheet, which would still have the effect of allowing sufficient air flow around all sides of the food product and of allowing liquid to drain from the food product. One could provide a support structure which is only partly porous, i.e. a structure which is porous over only part of its area. Such a structure would not be optimal, but could be used if circumstances warrant.

Food products such as bacon may curl or otherwise lift off the cooking surface during the cooking process. To overcome this problem, one can use a structure similar to that of FIG. 8, except that the layers would be positioned more closely together. That is, the racks are spaced apart from each other, but sufficiently close to prevent a strip of bacon, or other food product, from curling during the cooking process. Notwithstanding the fact that the piece of bacon is surrounded by support planes of the adjacent racks, located above and below the bacon, the strip of bacon will still be fully exposed to air during the cooking process, because of the porous nature of the support planes in the racks. Conventional ovens and toaster ovens generally have enough inside space to accommodate at least two spaced-apart racks.

The present invention is not limited to cooking bacon. It may be used for cooking other meat products, or for cooking any other food which is relatively thin and which can fit the space provided on the various sloped support planes.

The rack of the present invention therefore effectively comprises a stationary rotisserie. That is, the rack has the advantages of a rotisserie, in that air can flow to substantially all portions of the food product, and liquid can drain freely from the food product, but the rack has no moving parts. Moreover, in some cases, the food may become coated or bathed by liquid draining from other parts of the food. In at least some embodiments of the invention, the air can flow around all sides of the food product, and liquid can drain from all sides of the food product. The invention therefore substantially improves the cooking process, with a device of relatively small cost.

The rack of the present invention can be provided in various sizes, appropriate to different cooking devices. For example, the rack may be sized to fit within a standard cookie sheet, or it may be sized to fit within a toaster oven. The number of V's and/or W's provided in such racks may be varied, so as to accommodate the need to support the food product being cooked, and to accommodate the space available in the cooking device. But, in general, because the size of the food product will likely not vary, the size of the V's would likely need to be about the same, regardless of the cooking vessel. Thus, the major variable, in designing a rack to fit different cooking devices, is the number of V's in the rack.

The bacon rack of the present invention can be made of any material which will withstand normal cooking temperatures. But it preferably should also be made of a material which can safely be washed in an automatic dishwasher. It is also preferable to limit the number of welds, corners, and crevices in the rack, so as to prevent food particles from adhering to the rack, and to make the rack easier to clean.

The bacon rack of the present invention could be made of members formed of a non-stick material, or could be coated with a non-stick material.

One of the benefits of the bacon rack of the present invention is that the food product is not sitting in the liquid which has drained from the food product during cooking. To insure that the food product remains out of contact with the drained liquid, it may be preferable to provide additional feet (not shown) on the rack, or on the bottom layer of a stack of racks, so as to further elevate the rack from its support surface, such as that of vessel 60 of FIG. 6.

In another embodiment, the rack could be constructed such that its sections are foldable and/or collapsible. For example, the V-sections of FIG. 1 could pivot around axes defined by the dowels, and the entire structure could be folded on itself. Thus, one could provide a rack which is not only stackable but also laterally expandable. There could also be separable and/or joinable sets of Vs.

In another embodiment, one could provide a flat structure at the tops of the Vs, the flat structure being generally parallel to the bottom of the cooking vessel. This arrangement is not optimal, because the flat structure negates the benefit of the sloped planar members, but it may be useful in some applications.

The invention can be modified in further ways, which will be apparent to those skilled in the art. For example, the number of Vs provided in a rack can be varied to suit particular needs. The angles made by the planar surfaces, relative to the bottom of a cooking vessel, may also be varied. These and other such modifications should be considered to be within the spirit and scope of the following claims.

What is claimed is:

1. A rack for cooking foods, comprising a plurality of generally planar members, at least some of the planar members being porous, the planar members being connected to each other such that each planar member shares an edge with an adjacent planar member, each planar member being oblique relative to an adjacent planar member, wherein the planar members are oriented such that the rack defines a plurality of connected V-shaped structures, wherein each V-shaped structure includes a W-shaped structure located at a bottom portion of the "V", and wherein each V-shaped structure is of a same size and shape.

2. The rack of claim 1, further comprising at least one dowel connected along an edge of at least one planar member.

3. The rack of claim 2, wherein there is a dowel along every edge of each planar member.

4. The rack of claim 1, wherein each planar member is defined by a plurality of generally parallel support wires.

5. A rack for cooking foods, comprising a plurality of generally planar members, at least some of the planar members being porous, the planar members being connected to each other such that each planar member shares an edge with an adjacent planar member, each planar member being oblique relative to an adjacent planar member, further comprising at least one dowel connected along an edge of at least one planar member, wherein the planar members are oriented such that the rack defines a plurality of connected V-shaped structures, wherein each V-shaped structure is of a same size and shape, and wherein each V-shaped structure includes a W-shaped structure located at a bottom portion of the "V".

6. The rack of claim 5, wherein there is a dowel along every edge of each planar member.

* * * * *